United States Patent
Schroeder

(10) Patent No.: US 6,326,782 B1
(45) Date of Patent: Dec. 4, 2001

(54) TWO DIMENSIONAL MAGNETORESISTIVE POSITION SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/270,904

(22) Filed: Mar. 15, 1999

(51) Int. Cl.[7] .............................. G01B 7/14; H01L 43/08
(52) U.S. Cl. .............................. 324/207.21; 324/207.21; 338/32 R
(58) Field of Search .................. 324/207.21, 207.23, 324/252; 338/32 R; 345/160; 74/471 XY

(56) References Cited

U.S. PATENT DOCUMENTS

| | | | |
|---|---|---|---|
| 4,429,276 | 1/1984 | Narimatsu et al. | 324/207 |
| 5,041,785 | * 8/1991 | Bogaerts et al. | 324/207.23 |

FOREIGN PATENT DOCUMENTS 43 17 512 A1   1/1994   (DE) .

* cited by examiner

Primary Examiner—Walter E. Snow
(74) Attorney, Agent, or Firm—Margaret A. Dobrowitsky

(57) ABSTRACT

A magnetosensitive die and actualizing circuit therefor by which a plurality of individual magnetosensitive elements are arranged and configured so as to produce a two dimensional position sensor which does not require the use of active components. Four MR elements are provided, wherein each MR element has an orthogonally serpentine configuration. A first MR sensor is formed of two MR elements that are diametrically opposed along a first axis, and a second MR sensor is formed of the remaining two MR elements which are diametrically opposed along a second, orthogonal axis. Each MR element is interdigitated with both of the MR elements of the other MR sensor, such that each MR sensor is electrically independent and orthogonally oriented with respect to the other MR sensor. Accordingly, one MR sensor consisting of two MR elements senses position along a first axis, and the other MR sensor consisting of the two other MR elements senses position along a second axis that is orthogonal to the first axis. The interdigitation of the MR elements may be accomplished with geometries other than orthogonally serpentine.

20 Claims, 3 Drawing Sheets

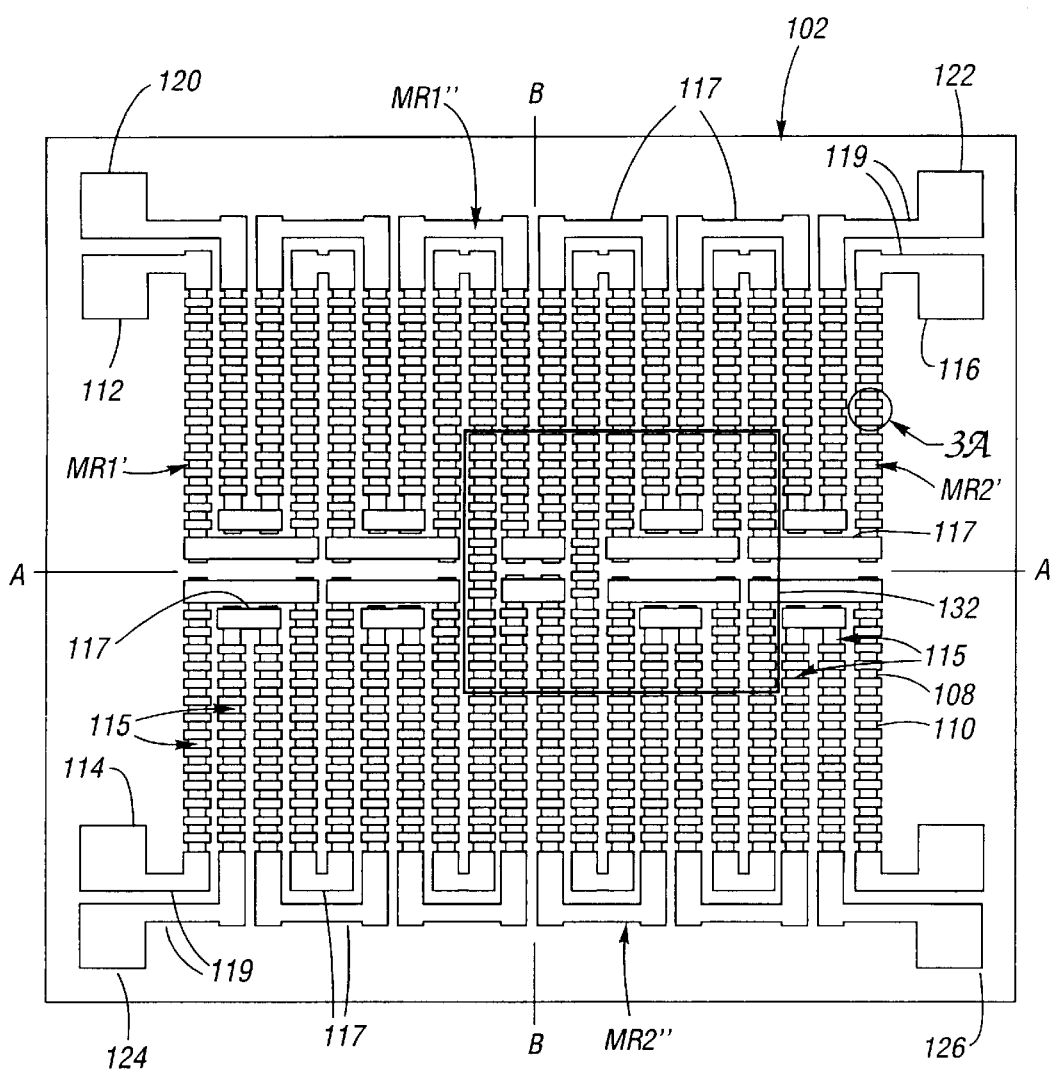
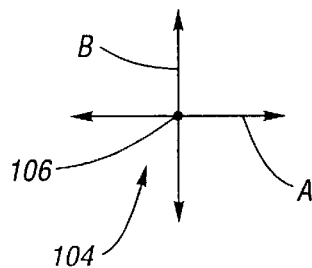
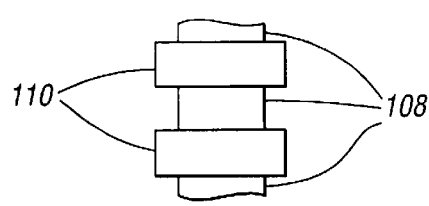
Fig. 3
Fig. 3A

TWO DIMENSIONAL MAGNETORESISTIVE POSITION SENSOR

TECHNICAL FIELD

The present invention relates to position sensors and more particularly to a two dimensional positional sensor utilizing a magnetoresistive (MR) die characterized by two orthogonally oriented magnetoresistive pairs which are electrically independent and equally magnetically biased.

BACKGROUND OF THE INVENTION

The principle of using a pair of matched MRs in a differential arrangement for the purpose of measuring small linear displacements along one dimension is well known in the art. FIG. 1 depicts one such example. In FIG. 1, MR die 10 is composed of two matched MRs, MR1 and MR2, a first terminal 16, a second terminal 18, and a third terminal 20. A small moving target 22, in the form of a permanent magnet if the die is not biased by an external magnetic field, or, if the MR die 10 is biased by an external magnetic field, then the target would, instead, be a ferromagnetic material. The target 22 is suspended, usually a fraction of a millimeter, above the MR die 10. A two dimensional Cartesian (X-Y) coordinate system 30 consisting of an X axis and a Y axis is superimposed on the MR die 10 as shown in FIG. 1, whereby the target 22 is movable along the X axis.

It is well known in the art that the resistance, $R_{MR}$, of an MR can be modulated by a varying magnetic flux density through the MR, which, in turn, varies the resistance of the MR. The portions of MR1 and MR2 under the target 22 are exposed to a considerably higher magnetic field than the portions of MR1 and MR2 not under the target. Thus, the more area of MR1 or MR2 covered by the target 22, the greater the resistance of MR1 or MR2, respectively. When the center line 24 of the target 22 coincides with the Y axis, which is aligned midway between MR1 and MR2, the areas of MR1 and MR2 covered by the target are equal and, thus, the resistance $R_{MR1}$ of MR1 is the same as the resistance $R_{MR2}$ of MR2, since MR1 is matched with MR2. Once the target 22 is moved in, for example, the positive X direction to the point where the center line 24 of the target is at the position 36 on the X axis, the area of MR1 covered by the target is less than the area of MR2 covered by the target, thereby causing the resistance of MR2 to increase while the resistance of MR1 decreases. A properly designed electrical circuit, as will be discussed shortly, can incorporate this change in resistance and produce an output voltage which is a linear function of the position of the target 22 relative to MR1 and MR2.

Such a circuit is depicted in FIG. 2. The first terminal 16 of MR1 is connected to the positive terminal 38 of a constant voltage source $V_{IN}$ whereas the third terminal 20 of MR2 is connected to ground 40. Resistors R1 and R2 have, preferably but not necessarily, the same value. $V_{OUT}$ is measured with respect to a pair of output terminals 42, 44.

With resistors R1 and R2 having the same value, $V_{OUT}$ can be expressed in terms of the current $I_{MR}$ passing through MR1 and MR2 and the resistances, $R_{MR1}$ and $R_{MR2}$, of MR1 and MR2, respectively, as:

$$V_{OUT}=(I_{MR}/2)(R_{MR2}-R_{MR1}) \text{ where } I_{MR}=V_{IN}(R_{MR2}+R_{MR1}).$$

The movement of the target 22 of FIG. 1 in the X direction increases the resistance of one MR and decreases the resistance of the other MR. However, since the MRs are matched, the magnitude of the increase of the resistance of one MR is the same as the magnitude of the decrease in resistance of the other MR, thereby causing the total resistance ($R_{MR2}+R_{MR1}$) to remain constant whereby the current MR also remains constant.

Thus, the output voltage, $V_{OUT}$, is directly proportional to the difference in the respective resistance of MR2 and MR1 and, hence, is a linear function of ($R_{MR2}-R_{MR1}$). Since the resistance of each MR is proportional to the area covered by the target 22 and the area covered is proportional to the position of the target along the X axis (wherein, the position of the target along the Y axis remains constant), the output voltage, $V_{OUT}$, is directly proportional to the position of the target along the X axis, as well.

However, there are many applications requiring two dimensional position sensors. Probably, the most famous application of this kind is the ubiquitous computer mouse employing a rubber covered ball, two rollers, and two position encoders. A two dimensional position sensor utilizing MR elements could be envisioned as an MR die consisting of an overlay of two orthogonal MR layers, with each layer composed of two MR elements. Unfortunately, two layer MRs are not practical and the die pattern would be, in effect, reduced to one layer consisting of four independent MR elements which would require the use of active components, such as operational amplifiers, to realize a two dimension position sensor.

Accordingly, what remains needed in the art is a solution to the problem of providing an MR die for a two dimensional position sensor which does not, necessarily, require the use of active components.

SUMMARY OF THE INVENTION

The present invention is an MR die, and actualizing circuit therefor, by which a plurality of individual MR elements are arranged and configured so as to produce a two dimensional position sensor which does not, necessarily, require the use of active components.

Structurally, the present invention is composed of an MR die consisting of a number of interdigitated MR elements, wherein each MR element is composed of a number of serially connected straight segments, each characterized by a magnetosensitive material on which a multiplicity of conductive shorting bars are deposited in regularly spaced intervals therealong. In the preferred form of the present invention, the segments are composed of indium antimonide (InSb) epitaxial film mesas, and the conductive shorting bars are composed of gold bars deposited thereupon. The ends of the segments of each MR element are serially connected by conductive bridges, preferably of gold. The techniques to fabricate the MR elements is elaborated in U.S. Pat. No. 5,153,557, issued Oct. 6, 1992 and U.S. Pat. No. 5,184,106, issued Feb. 2, 1993, both patents being owned by the assignee hereof and are hereby incorporated by reference herein.

In the MR die according to the preferred embodiment of the two dimensional position sensor of the present invention, four MR elements are provided, wherein each MR element has an orthogonally serpentine configuration. A first MR sensor is formed of two MR elements that are diametrically opposed along a first axis, and a second MR sensor is formed of the remaining two MR elements which are diametrically opposed along a second, orthogonal axis.

Each MR element is interdigitated with both of the MR elements of the other MR sensor, such that each MR sensor is electrically independent and orthogonally oriented with respect to the other MR sensor. Accordingly, one MR sensor consisting of two MR elements senses position along a first axis, and the other MR sensor consisting of the two other MR elements senses position along a second axis that is orthogonal to the first axis, whereupon an electronic circuit consisting of passive components (i.e. operational amplifiers are not required) is employed, as is analogously done for the one dimensional sensor of FIG. 2.

The interdigitation of the MR elements may be accomplished with geometries other than orthogonally serpentine. It is preferable that the MR elements be matched to each other and that the geometry of the interdigitation of the MR elements is such that the magnitude of the increase of the resistance of one MR element is the same as the magnitude of the decrease in resistance of the other MR element, but this is not essential. Proper circuit design with appropriate weighting factors determined empirically or theoretically can be applied by those of ordinary skill in the art to accommodate MR element mismatch and interdigitation geometries, based upon the principles elaborated in the present disclosure.

Accordingly, it is an object of the present invention to provide an interdigitated MR die which provides a two dimensional MR position sensor.

It is an additional object of the present invention to provide a two dimensional position sensor which does not, necessarily, require the use of active components.

These, and additional objects, advantages, features, and benefits of the present invention will become apparent from the following specification.

BRIEF DESCRIPTION OF THE DRAWINGS

FIG. 3 depicts an example of the preferred embodiment of an MR die of a two dimensional MR position sensor according to the present invention.

FIG. 3A is a detail view of an MR element of the MR die at circle 3A of FIG. 3.

DESCRIPTION OF THE PREFERRED EMBODIMENT

Figure 4:
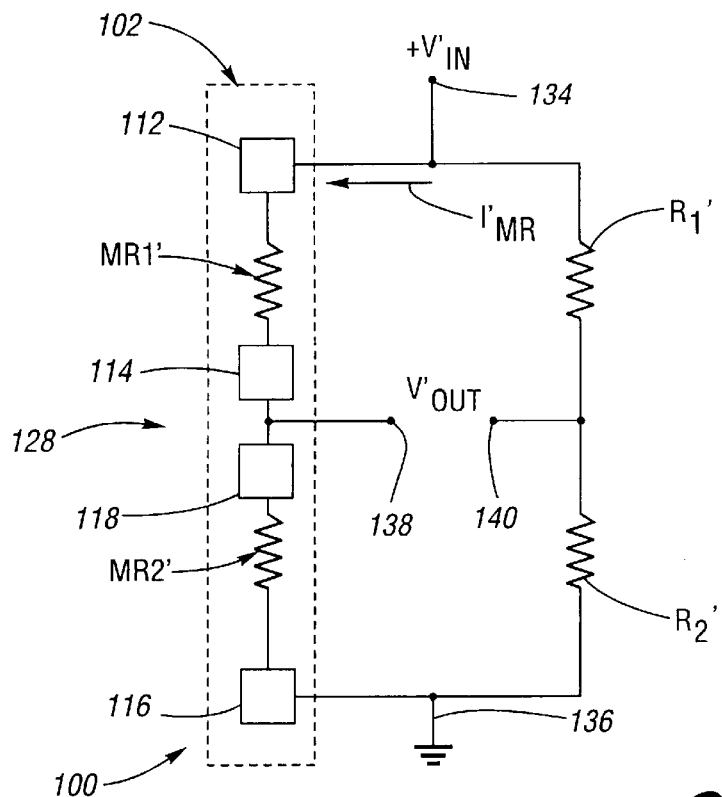
FIG. 4 shows an electronic circuit for actualizing the two dimensional MR position sensor along a first axis.
Figure 5:
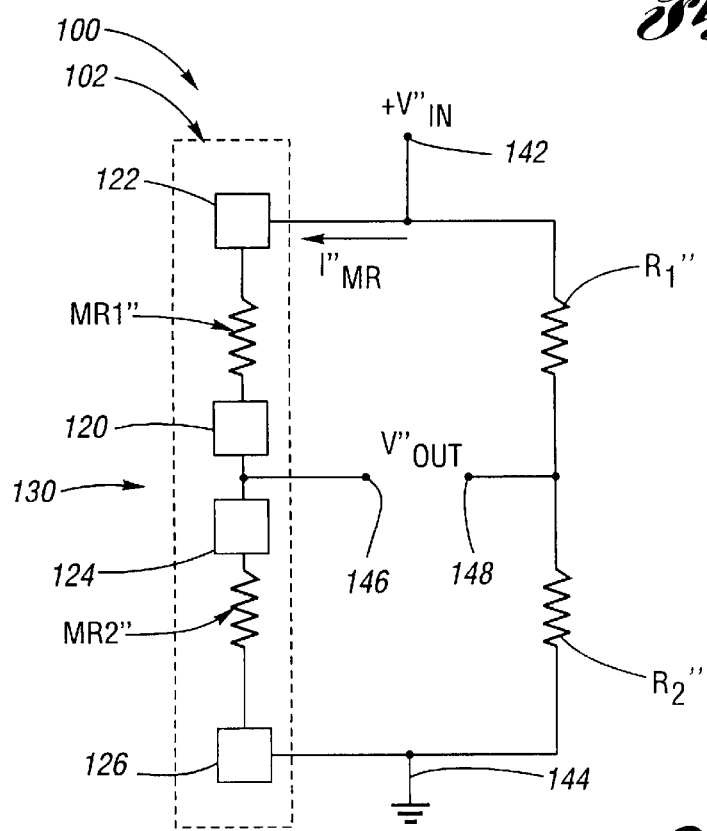
FIG. 5 shows an electronic circuit for actualizing the two dimensional MR position sensor along a second, orthogonal axis.

Turning now to FIGS. 3 through 5, an example of the preferred embodiment of the two dimensional MR position sensor 100 is shown collectively by FIGS. 4 and 5, wherein FIGS. 3 and 3A depict a preferred MR die 102 thereof and FIGS. 4 and 5 collectively depict the enabling circuitry thereof. The inset of FIG. 3 depicts a Cartesian coordinate system 104 having an A axis, an orthogonal B axis, and an origin 106, wherein the Cartesian coordinate system is superimposed on the MR die 102 such that the origin 106 is at the center of the MR die, the A axis is along line A—A, and the B axis is along the line B—B.

As shown at FIG. 3, the MR die 102 consists of a plurality of interdigitated MR elements, wherein each MR element is matched to the other MR elements. There are four MR elements depicted at FIG. 3: MR1', MR2', MR1", and MR2", each having, respectively, resistances: $R_{MR1'}$, $R_{MR2'}$, $R_{MR1''}$ and $R_{MR2''}$ which vary with magnetic field variation.

According to the preferred embodiment depicted at FIG. 3, each MR element is composed of a number of straight segments 115 composed of a multiplicity of MR cells 108 demarcated by shorting bars 110. In the preferred form of the present invention, the segments 115 are composed of indium antimonide (InSb) epitaxial film mesas, and the shorting bars 110 which, demarcate the MR cells 108, are composed preferably of gold bars deposited thereupon. The ends of adjacent segments 115 of each MR element are serially connected by conductive bridges 117, preferably composed of gold, and leads 119, preferably also of gold, are provided from each MR element to its respective bonding pads (or terminals).

According to a preferred method of fabrication, an indium antimonide epitaxial film is formed, then masked and etched to thereby provide the aforementioned mesas characterizing the segments 115. The shorting bars 110 are thereupon deposited, wherein the InSb mesa not covered by the shorting bars provides the MR cells 108. The techniques for fabricating the MR elements is elaborated in U.S. Pat. No. 5,153,557, issued Oct. 6, 1992 and U.S. Pat. No. 5,184,106, issued Feb. 2, 1993, both patents being owned by the assignee hereof and which have been incorporated herein by reference hereinabove.

As can be discerned from FIG. 3, the endpoints of MR element MR1' terminate at a first terminal (bonding pad) 112 and a second terminal (bonding pad) 114. The endpoints of MR element MR2' terminate at a third terminal (bonding pad) 116 and a fourth terminal (bonding pad) 118. The endpoints of MR element MR1" terminate at a fifth terminal (bonding pad) 120 and a sixth terminal (bonding pad) 122. The endpoints of MR element MR2" terminate at a seventh terminal (bonding pad) 124 and an eighth terminal (bonding pad) 126.

A pair of MR sensors is thereby formed, each composed of diametrically opposed MR elements along each of the two mutually orthogonal axes, A, B: a first MR sensor 128 formed of MR elements MR1' and MR2', and a second MR sensor 130 formed of MR elements MR1", and MR2". Each MR element is interdigitated with both of the MR elements of the other MR sensor, such that each MR sensor is electrically independent and orthogonally oriented with respect to the other MR sensor. Accordingly, the first MR sensor 128 consists of MR elements MR1' and MR2' and senses position along the A axis (line A—A) via the electrical circuit of FIG. 4; and the second MR sensor 130 consists of MR elements MR1" and MR2" and senses position along the B axis (line B—B) via the electrical circuit of FIG. 5. Preferably, the interdigitation is provided by an orthogonally serpentine (meandering) pattern, as shown at FIG. 3. The orthogonally serpentine interdigitation and matching of the MR elements MR1', MR2', MR1", and MR2" provides the MR die 102 of the two dimensional MR position sensor 100.

Figure 1:
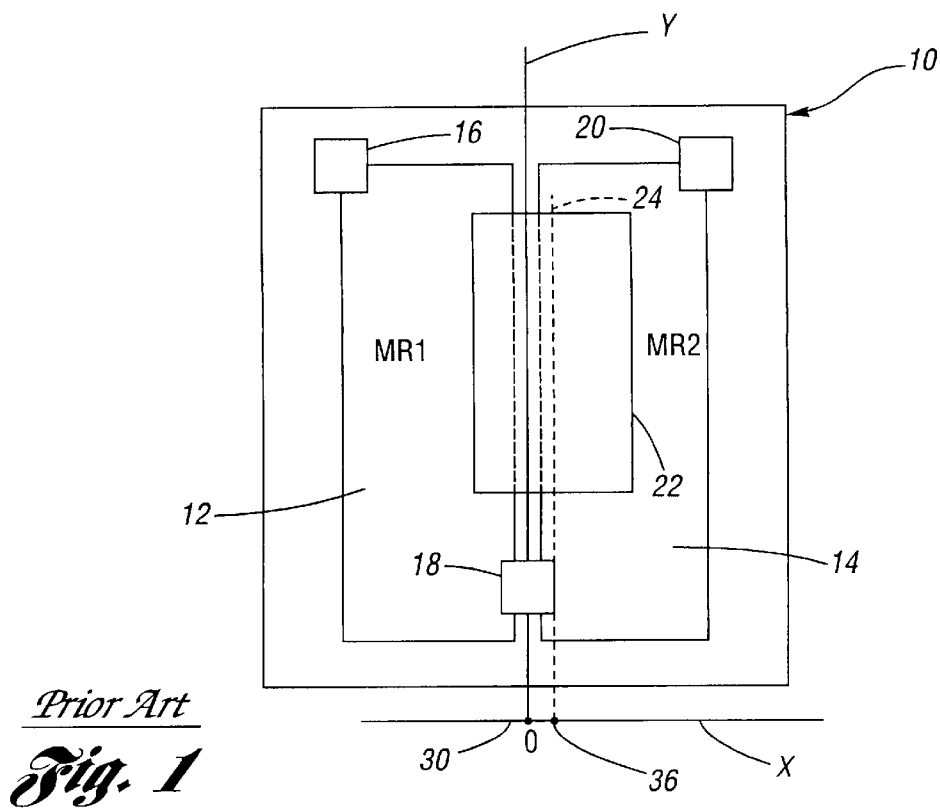
FIG. 1 depicts a prior art one dimensional MR sensor.

Turning attention now to the first MR sensor 128, MR element MR1' is analogous to MR1 of FIG. 1 and MR element MR2' is analogous to MR2 of FIG. 1, wherein the A axis (line A—A) is analogous to the X axis of FIG. 1. The first terminal 112 is analogous to the first terminal 16 of FIGS. 1 and 2; the third terminal 116 is analogous to the third terminal 20 of FIGS. 1 and 2; and connection of the second terminal 114 to the fourth terminal 118 is analogous to the second terminal 18 of FIGS. 1 and 2.

In operation a movable magnetic material target 132 is suspended, usually a fraction of a millimeter, above the MR die 102, wherein the target is in the form of a permanent magnet if the MR die is not biased by an external magnetic field, or in the form of a ferromagnetic material if the MR die is biased by an external magnetic field. If the target 132 is then moved along the A axis (line A—A), the effect on MR element resistance is analogous to that as previously described for FIGS. 1 and 2.

For example, if the MR die 102 is not biased by an external magnetic field, the target 132 is in the form of a permanent magnet, and the MR cells 108, respectively, of MR element MR1' and of MR element MR2' which are under the target are exposed to a considerably higher magnetic field than the MR cells, respectively, of MR elements MR1' and MR2' which are not under the target. Thus, the more MR cells of MR element MR1' or element MR2' that are respectively covered by the target, the greater the resistance, respectively, of MR element MR1' or MR element MR2'. When the center of the target 132 coincides with the origin 106, which coordinate is aligned at the center of the MR die 102, the number of MR cells 108 of MR element MR1' and of MR element MR2' covered by the target are equal. Thus, the resistance $R_{MR1'}$ of MR element MR1' is the same as the resistance $R_{MR2'}$ of MR element MR2', since MR element MR1' is matched with MR element MR2'.

Once the target 132 is moved along, for example, the positive A axis, corresponding to a movement from left to right in FIG. 3 along the line A—A, the number of MR cells 108 of MR element MR1' covered by the target is less than the number of MR cells of element MR2' covered by the target. Accordingly, the resistance $R_{MR2'}$, of MR element MR2' increases, while the resistance $R_{MR1'}$ of MR element MR1' decreases. A properly designed electrical circuit, as discussed hereinbelow and shown at FIG. 4, incorporates this change in resistance and produces an output voltage which is a linear function of the position of the target 132 in relation to the MR die 102.

Turning attention now to the enabling circuit of FIG. 4, the first terminal 112 of element MR1' is connected to the positive terminal 134 of a constant voltage source $+V'_{IN}$, whereas the third terminal 116 of MR element MR2' is connected to ground 136. Resistors R1' and R2' have, preferably, but not necessarily, the same value. $V'_{OUT}$ is measured with respect to output terminals 138, 140. With resistances R1' and R2' having the same value, $V'_{OUT}$ can be expressed in terms of the current $I'_{MR}$ passing through MR1' and MR2' and the resistance $R_{MR1'}$ and $R_{MR2'}$ of each of MR elements MR1' and MR2' as:

$$V'_{OUT}=(I'_{MR}/2)(R_{MR2'}-R_{MR1'}) \text{ where } I'_{MR}=V'_{IN}/(R_{MR2'}+R_{MR1'}).$$

The movement of the target 132 along only the A axis (line A—A) increases the resistance of one MR element and decreases the resistance of the other MR element. However, due to the matching of the MR elements MR1', MR2' and the geometry of the interdigitation of the MR elements, the magnitude of the increase of the resistance of one MR element is, preferably, the same as the magnitude of the decrease in resistance of the other MR element, thereby causing the total resistance ($R_{MR2'}+R_{MR1'}$) to remain constant, whereby the current $I'_{MR}$ also remains constant.

Thus, the output voltage, $V'_{OUT}$, is directly proportional to the difference in resistances of MR element MR2' and MR element MR1' and, hence, is a linear function of ($R_{MR2'}-R_{MR1'}$). Since the resistance of each MR element is proportional to the number of MR cells 108 covered by the target 132, and the number of MR cells covered is proportional to the position of the target along the A axis (line A—A), wherein the target position remains constant with respect to the B axis (line B—B). Accordingly, the output voltage, $V'_{OUT}$, is directly proportional to the position of the target along the A axis (line A—A), as well.

Turning attention now to the second MR sensor 130, MR element MR" is analogous to MR1 of FIG. 1, MR element MR2" is analogous to MR2 of FIG. 1, and the B axis is analogous to the X of FIG. 1 (the X axis of FIG. 1 was the axis of movement of the target). The sixth terminal 122 is analogous to the first terminal 16 of FIGS. 1 and 2; the eighth terminal 126 is analogous to the third terminal 20 of FIGS. 1 and 2; and the connection of the fifth terminal 120 to the seventh terminal 124 is analogous to the second terminal 18 of FIGS. 1 and 2.

Figure 2:
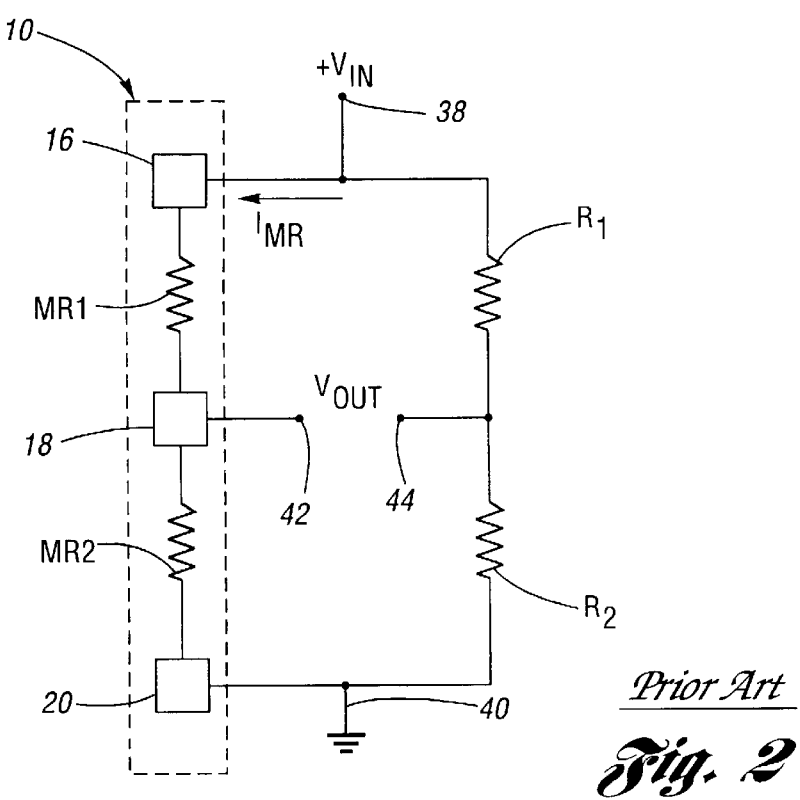
FIG. 2 shows a prior art electronic circuit for actualizing the one dimensional MR sensor of FIG. 1.

If the small moving target 132 as described hereinabove is suspended above the MR die 102 as described hereinabove and then moved along the B axis (ie., along line B—B), the effect on MR resistance is analogous to that previously described for FIG. 1 and FIG. 2.

For example, if the MR die 102 is not biased by an external magnetic field, the target 132 is in the form of a permanent magnet. The MR cells 108 of MR element MR1" and of MR element MR2" under the target 132 are exposed to a considerably higher magnetic field than the MR cells of MR elements MR1" and MR" not under the target. Thus, the more MR cells 108 of MR elements MR1" or MR2" that are covered by the target, the greater the resistance, $R_{MR1"}$ and $R_{MR2"}$, respectively, of MR element MR1" or MR element MR2". When the center of the target 132 coincides with the origin 106, which coordinate is aligned at the center of the MR die 102, the number of MR cells 108 of MR elements MR1" and MR2" covered by the target are equal and, thus, the resistance $R_{MR1"}$ of MR element MR1" is the same as the resistance $R_{MR2"}$ of MR element MR2", since MR element MR1" is matched with MR element MR2".

Once the target 132 is moved along, for example, the positive B axis corresponding to a movement from top to bottom in FIG. 3 along line B—B, the number of MR cells 108 of MR element MR1" covered by the target is less than the number of MR cells of MR element MR2" covered by the target 132. Accordingly, the resistance $R_{MR2"}$ of MR element MR2" increases while the resistance $R_{MR1"}$ of MR element MR1" decreases. A properly designed electrical circuit, discussed below and shown at FIG. 5, incorporates this change in resistance and produces an output voltage which is a linear function of the position of the target 132 relative to the MR die 102.

Turning attention now to the enabling circuit of FIG. 5, the sixth terminal 122 of MR element MR1" is connected to the positive terminal 142 of a constant voltage source +V"(which may be identical with +V'), whereas the eighth terminal 126 of element MR2" is connected to ground 144 (which may be identical with ground 136). Resistors R1" and R2" have, preferably, but not necessarily, the same value. $V'_{OUT}$ is measured with respect to output terminals 146, 148.

With resistors R1" and R2" having the same value, $V"_{OUT}$ can be expressed in terms of the current $I"_{MR}$ passing through MR elements MR1" and MR2" and the resistances, $R_{MR1"}$ and $R_{MR2"}$, of MR elements MR1" and MR2" as:

$$V"_{OUT}=(I"_{MR}/2)(R_{MR2"}-R_{MR1"}) \text{ where } I"_{MR}=V"_{IN}/(R_{MR2"}+R_{MR1"}).$$

The movement of the target 132 along only the B axis (line B—B) increases the resistance of one MR element and decreases the resistance of the other MR element. However, due to the matching of the MR elements and the geometry of the interdigitation of the MR elements, the magnitude of the increase of the resistance of one MR element is, preferably, the same as the magnitude of the decrease in resistance of the other MR element, thereby causing the total resistance ($R_{MR2"}+R_{MR1"}$) to remain constant, whereby the current $I"_{MR}$ also remains constant.

Thus, the output voltage, $V"_{OUT}$, is directly proportional to the difference in resistance of MR elements MR2" and MR1" and, hence, is a linear function of ($R_{MR2"}-R_{MR1"}$). Since the resistance of each MR element is proportional to the number of MR cells 108 covered by the target 132 and the number of MR cells covered is proportional to the position of the target along the B axis (line B—B), wherein the position of the target 132 remains constant along the A axis (line A—A). As a result, the output voltage, $V"_{OUT}$, is directly proportional to the position of the target 132 along the B axis (line B—B), as well.

In conclusion, the orthogonally serpentine interdigitation of the MR elements MR1', MR2', MR1", and MR2" and the associated enabling circuitry therefor provide a two dimensional MR position sensor 100 having the properties of two MR sensors, wherein each of the MR sensors consist of two MR elements such that each MR sensor is electrically independent and magnetically orthogonal with respect to the other MR sensor. Accordingly, the first MR sensor 128 consists of two MR elements MR1' and MR2' and senses target position along the A axis (line A—A), while the second MR sensor 130 consists of the remaining two MR elements MR1" and MR1" and senses target position along the B axis (line B—B), such that an electronic circuit consisting of passive components is all that is needed for enablement (ie., operational amplifiers are not required).

The interdigitation of the MR elements MR1', MR2', MR1", and MR2" may be accomplished with other geometries than the orthogonal serpentine configuration depicted in FIG. 3. For example, depending upon the die manufacturing process, a triangular interdigitation may be employed. It is preferable that the MR elements be matched to each other and that the geometry of the interdigitation of the MR elements be as compact as is practicable, as for example the width thereof approaching the separation therebetween, such that the magnitude of the increase of the resistance of one MR element is the same as the magnitude of the decrease in resistance of the other MR element, but this is not essential. Proper circuit design with appropriate weighting factors determined empirically or theoretically can be applied by those having ordinary skill in the art to accommodate MR element mismatch and interdigitation geometries, using as a guide the disclosure herein provided.

It is to be understood that while magnetoresistors (MRs) were exemplified in the forgoing detailed description of a preferred embodiment of the present invention, other analogous sensing elements, such as Hall elements, may be utilized as an equivalent substitution therefor, and generally denoted as a "magnetosensitive element".

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A die for a two dimensional position sensor, comprising:
   a first magnetosensitive sensor comprising a first pair of diametrically disposed magnetosensitive elements; and
   a second magnetosensitive sensor comprising a second pair of diametrically disposed magnetosensitive elements, wherein said first and second pairs of magnetosensitive elements are mutually orthogonally oriented and mutually interdigitated such that said first pair of magnetoresistive elements is electrically independent of said second pair of magnetosensitive elements, and wherein said first and second magnetosensitive elements are substantially equally magnetically biased;
   wherein said first magnetosensitive sensor senses movement of a magnetic material target along a first axis, and wherein said second magnetosensitive sensor senses movement of a magnetic material target along a second axis that is orthogonal to the first axis.

2. The die of claim 1, wherein each magnetosensitive element comprises a multiplicity of magnetosensitive cells.

3. The die of claim 1, wherein said first and second pairs of magnetosensitive elements comprise:
   a first magnetosensitive element;
   a second magnetosensitive element, wherein said first and second magnetosensitive elements are diametrically disposed in relation to a first axis;
   a third magnetosensitive element; and
   a fourth magnetosensitive element, wherein said third and fourth magnetosensitive elements are diametrically disposed in relation to a second axis;
   wherein said first and second axes are orthogonal to each other; and
   wherein said first and second magnetosensitive elements are independently interdigitated with said third and fourth magnetosensitive elements, and said third and fourth magnetosensitive elements are independently interdigitated with said first and second magnetosensitive elements.

4. The die of claim 3, wherein said interdigitation is orthogonally serpentine.

5. The die of claim 4, wherein each magnetosensitive element comprises a plurality of parallel segments serially connected by conductive bridges; and wherein said interdigitation is compact.

6. The die of claim 3, wherein each magnetosensitive element comprises a multiplicity of magnetosensitive cells.

7. The die of claim 6, wherein each magnetosensitive element comprises a plurality of parallel segments serially connected by conductive bridges, wherein the magnetosensitive cells of each segment are demarcated by a multiplicity of regularly spaced shorting bars located thereupon.

8. The die of claim 7, wherein said interdigitation is orthogonally serpentine.

9. The die of claim 8, wherein said interdigitation is compact.

10. A two dimensional position sensor, comprising:
    a first magnetosensitive sensor comprising a first pair of diametrically disposed magnetosensitive elements, wherein said first magnetosensitive sensor senses movement of a magnetic material target along a first axis;
    a second magnetosensitive sensor comprising a second pair of diametrically disposed magnetosensitive elements, wherein said first and second pairs of magnetosensitive elements are mutually orthogonally oriented and mutually interdigitated such that said first and second magnetosensitive elements are substantially equally magnetically biased, wherein said second magnetosensitive sensor senses movement of the magnetic material target along a second axis that is orthogonal to the first axis; and
    circuit means comprising passive components connected with said first and second magnetosensitive sensors for providing a signal responsive to said first and second magnetosensitive sensors to sensing position of the magnetic material target with respect thereto, wherein said first pair of magnetoresistive elements is electrically independent of said second pair of magnetosensitive elements.

11. The position sensor of claim 10, wherein each magnetosensitive element comprises a multiplicity of magnetosensitive cells.

12. The position sensor of claim 10, wherein said first and second pairs of magnetosensitive elements comprise:
- a first magnetosensitive element;
- a second magnetosensitive element, wherein said first and second magnetosensitive elements are diametrically disposed in relation to a first axis;
- a third magnetosensitive element; and
- a fourth magnetosensitive element, wherein said third and fourth magnetosensitive elements are diametrically disposed in relation to a second axis;
- wherein said first and second axes are orthogonal to each other; and
- wherein said first and second magnetosensitive elements are independently interdigitated with said third and fourth magnetosensitive elements, and said third and fourth magnetosensitive elements are independently interdigitated with said first and second magnetosensitive elements.

13. The position sensor of claim 12, wherein said interdigitation is orthogonally serpentine.

14. The position sensor of claim 13, wherein each magnetosensitive element comprises a plurality of parallel segments serially connected by conductive bridges; and wherein said interdigitation is compact.

15. The position sensor of claim 12, wherein each magnetosensitive element comprises a multiplicity of magnetosensitive cells.

16. The position sensor of claim 15, wherein each magnetosensitive element comprises a plurality of parallel segments serially connected by conductive bridges, wherein the magnetosensitive cells of each segment are demarcated by a multiplicity of regularly spaced shorting bars located thereupon.

17. The position sensor of claim 16, wherein said interdigitation is orthogonally serpentine.

18. The position sensor of claim 17, wherein said interdigitation is compact.

19. A die for a two dimensional position sensor, comprising:
- a first magnetosensitive sensor comprising a first pair of diametrically disposed magnetosensitive elements; and
- a second magnetosensitive sensor comprising a second pair of diametrically disposed magnetosensitive elements, wherein said first and second pairs of magnetosensitive elements are mutually orthogonally oriented and mutually interdigitated such that said first pair of magnetoresistive elements is electrically independent of said second pair of magnetosensitive elements, and wherein said first and second magnetosensitive elements are equally magnetically biased;
- wherein said first magnetosensitive sensor senses movement of a magnetic material target along a first axis, and wherein said second magnetosensitive sensor senses movement of a magnetic material target along a second axis that is orthogonal to the first axis; and
- wherein each magnetosensitive element comprises a multiplicity of magnetosensitive cells.

20. The die of claim 19, wherein each magnetosensitive element comprises a plurality of parallel segments serially connected by conductive bridges, wherein the magnetosensitive cells of each segment are demarcated by a multiplicity of regularly spaced shorting bars located thereupon.

* * * * *